United States Patent
Boehm et al.

(10) Patent No.: US 9,569,335 B1
(45) Date of Patent: Feb. 14, 2017

(54) EXPLOITING SOFTWARE COMPILER OUTPUTS FOR RELEASE-INDEPENDENT REMOTE CODE VULNERABILITY ANALYSIS

(71) Applicant: SAP SE, Walldorf (DE)

(72) Inventors: Thilo Boehm, Schriescheim (DE); Juergen Lehmann, Heidelberg (DE); Wolf Hagen Thuemmel, Heppenheim (DE); Thorsten Marcus Dunz, Schwetzingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/877,522

(22) Filed: Oct. 7, 2015

(51) Int. Cl.
*G06F 9/44* (2006.01)
*G06F 11/36* (2006.01)

(52) U.S. Cl.
CPC ......... *G06F 11/3604* (2013.01); *G06F 11/368* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 5,754,860 A * | 5/1998 | McKeeman | ........ | G06F 11/3684 714/E11.208 |
| 7,603,659 B2 | 10/2009 | Blumenthal et al. | | |
| 8,239,371 B2 | 8/2012 | Wintel et al. | | |
| 8,826,308 B1 | 9/2014 | Jolfaei et al. | | |
| 8,977,608 B2 | 3/2015 | Boehm et al. | | |
| 9,043,815 B2 | 5/2015 | Jolfaei et al. | | |
| 9,047,095 B2 | 6/2015 | Bohlmann et al. | | |
| 2008/0270992 A1* | 10/2008 | Georgieva | ................ | G06F 8/60 717/127 |
| 2009/0100410 A1* | 4/2009 | Pouliot | ..................... | G06F 8/75 717/122 |
| 2013/0097706 A1* | 4/2013 | Titonis | ..................... | G06F 21/56 726/24 |
| 2014/0026127 A1* | 1/2014 | McEwan | ................... | G06F 8/37 717/146 |
| 2014/0189662 A1* | 7/2014 | Mameri | .................. | G06F 8/427 717/140 |
| 2014/0344817 A1* | 11/2014 | Jovanovic | ............. | G06F 9/5066 718/102 |
| 2014/0372398 A1 | 12/2014 | Baumgarten et al. | | |

* cited by examiner

*Primary Examiner* — Wei Zhen
*Assistant Examiner* — Timothy Duncan
(74) *Attorney, Agent, or Firm* — Fish & Richardson P.C.

(57) ABSTRACT

A central check system (CCS) is coupled to a remote software system (RSS). Data is fetched from the RSS, the data being software code derivatives generated by a software compiler on the RSS with a version different than a version of the software program associated with the CCS. Static software testing is performed of the software program on the CCS using the fetched data and test results provided in a required format.

20 Claims, 6 Drawing Sheets

EXPLOITING SOFTWARE COMPILER OUTPUTS FOR RELEASE-INDEPENDENT REMOTE CODE VULNERABILITY ANALYSIS

BACKGROUND

IT infrastructures of enterprises are constantly under attack from a variety of threats (e.g., hacking or industrial espionage efforts). To satisfy various requirements (e.g., product standards, performance, legal, security, and other requirements) related to the security of software, developers need to perform statistical analysis system (SAS) testing to check their developed software for software code vulnerabilities that could be exploited by hackers and malicious individuals. SAS testing typically includes static application security testing (SAST) and is designed to analyze application source code, byte code, and binaries of an application from the "inside out" in a non-running state (in other words, static testing involves examination of a software program's code and its associated documentation but does not require the software program be executed) for coding and design conditions that are indicative of security vulnerabilities in the software's inputs and outputs that can easily be missed by a programmer. The latest release-versioned SAS tools are normally not consumable by an older (legacy)-versioned release of software development tools. As the SAS tools provide the ability to check for, among other things, application backdoors, malicious code, and other threats that may exist in deployed software-applications, the inability of legacy-versioned software development tools to consume the latest release-versioned SAS testing tools for software developed on the legacy-versioned releases of the software development tools can result in software that may contain unnecessary security vulnerabilities.

SUMMARY

The present disclosure relates to exploiting software compiler outputs for release-independent remote code vulnerability analysis.

A central check system (CCS) is coupled to a remote software system (RSS). Data is fetched from the RSS, the data being software code derivatives generated by a software compiler on the RSS with a version different than a version of the software program associated with the CCS. Static software testing is performed of the software program on the CCS using the fetched data and test results provided in a required format.

Other implementations can include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

For example, one computer-implemented method includes coupling a central check system (CCS) to a remote software system (RSS); fetching data from the RSS, the data being software code derivatives generated by a software compiler on the RSS with a version different than a version of the software program associated with the CCS; performing static software testing of the software program on the CCS using the fetched data; and providing test results in a required format.

The foregoing and other implementations can each optionally include one or more of the following features, alone or in combination:

A first aspect, combinable with the general implementation, wherein the software program version on the RSS is earlier than the software program version associated with the CCS.

A second aspect, combinable with the general implementation, wherein the software code derivatives represent an abstract description of the software program.

A third aspect, combinable with the general implementation, wherein the software code derivatives include one or more of a list of statements occurring in the software program, a list of symbols occurring in the software program, a list of tokens, a list of enhancements, and data describing the structure of the software program.

A fourth aspect, combinable with the general implementation, wherein the software code derivatives are generated based on the software language used to construct the software program and metadata of development objects used in the software program.

A fifth aspect, combinable with the general implementation, comprising using the software compiler on the RSS to ensure the correctness of the software program on the RSS.

A sixth aspect, combinable with the general implementation, wherein software code derivatives are used for testing of the software program on the CCS to avoid incompatibilities between compiled software program byte code associated with the version of the software program on the RSS and the software version of the CCS.

A seventh aspect, combinable with the general implementation, comprising, while fetching the software code derivatives, requesting, on-demand, additional metadata related to the fetched software code derivatives.

The subject matter described in this specification can be implemented in particular implementations so as to realize one or more of the following advantages. First, the described approach allows a remote software system (RSS) to perform Static Application Security testing (SAST) as part of Statistical Analysis System (SAS) testing using a testing (check) system even when the RSS is executing older (legacy) releases of software development tools that are not capable of consuming the latest available versions of SAS testing tools. Second, the described approach does not transfer source or byte code from an RSS into a central check system (CCS) but transfers only compiler-generated source code derivatives based on the source code. The software compiler in the RSS is typically used only to assure the correctness (e.g., syntax-error free condition) of software source code and to generate the source code derivatives (the compiler and the software code is based on the same version of software development tools). One advantage of transferring source code derivatives is an increase in security for the developers of software in that valuable source code is not vulnerable to interception over a network. Third, the transfer of only source code derivatives allows a CCS with a later version of software development tools including SAS/SAST testing functionality to perform static testing of the transferred source code derivatives. The static testing can be performed even with source code derivatives based on software developed with earlier versions of software development tools. This removes the necessity of a different check system with particular software development tool versions to be established by a business customer/partner on the same system/locally for each of their software systems. The RSS can be tested independent of its underlying hardware and software release version by the CSS and does not have to be upgraded to a particular software release version to allow for the latest testing technologies to be used. Fourth, to use the CCS, an RSS needs only to interface with the CCS using a server add-on to provide the necessary interfaces between the RSS and the CCS. The approach allows multiple systems representing different system landscapes (e.g., development, quality, and production) to independently use the SAS tools of the CCS to perform static software testing even if each of the different landscapes are using legacy releases of software development tools. A CCS can be provided by the owner of an RSS computing system or by a third-party that allows the RSS owner to connect to the third-party-provided CCS for SAS testing purposes. Fifth, network traffic is reduced, since source code derivatives are transported to the CCS instead of full byte code of the software program. Source code derivatives require less storage space compared to the base software source code. Sixth, overall computing time is also saved on the CCS. Scanning and parsing of software source code on the CCS is unnecessary because the code derivatives fetched from the RSS are resultant outputs of prior scanning, parsing, etc. already performed by the RSS software compiler of the software source code stored on the RSS. Seventh, the use of source code derivatives can help to avoid incompatibility problems which would be seen in typical software testing of byte code if a compilation step were to be performed on the CCS using a legacy-versioned release software compiler with legacy-versioned source code from the RSS. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
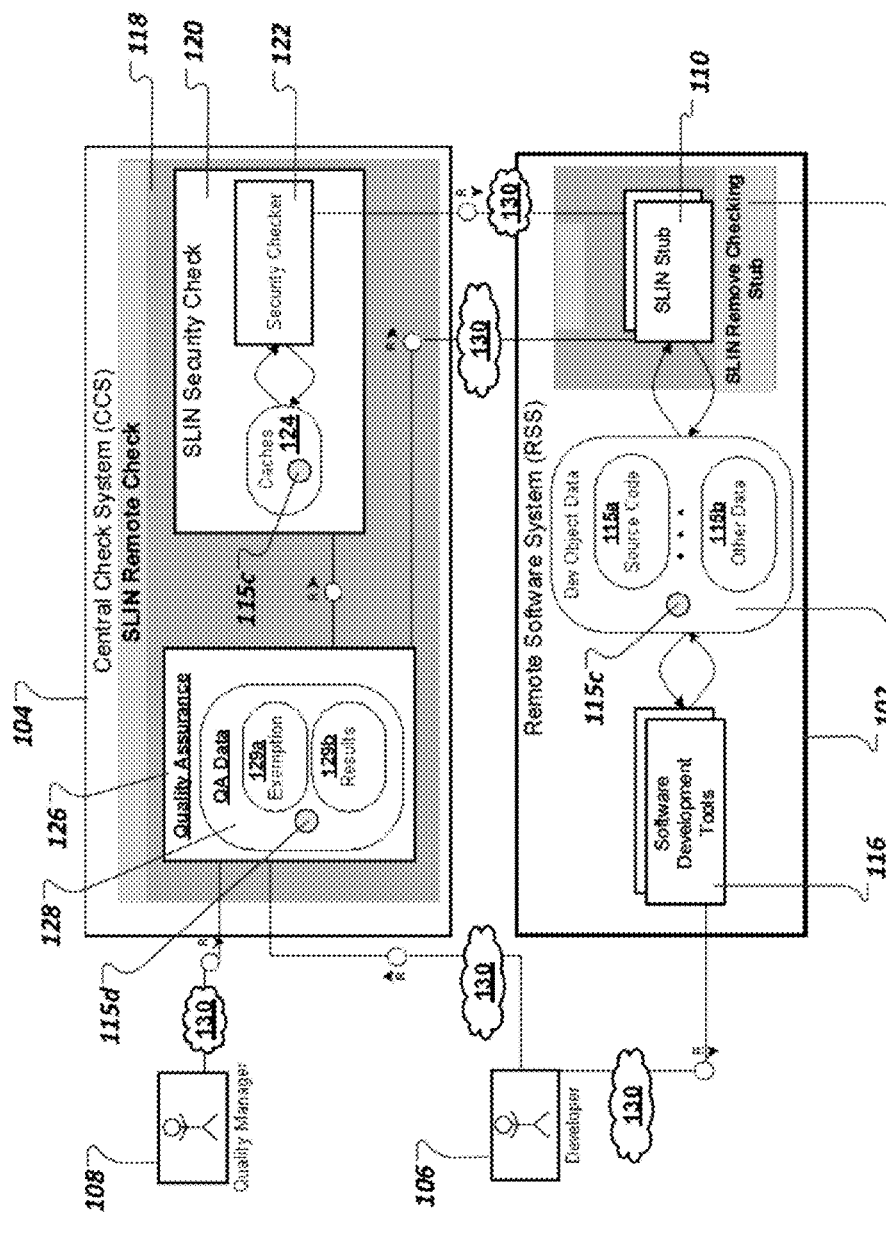
FIG. 1 is a high-level architectural block diagram illustrating an example distributed computing system (EDCS) for exploiting software compiler outputs for release-independent remote code vulnerability analysis, according to an implementation.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

IT infrastructures of enterprises are constantly under attack from a variety of threats (e.g., hacking or industrial espionage efforts). To satisfy various requirements (e.g., product standards, performance, legal, security, and other requirements) related to the security of software, developers need to perform statistical analysis system (SAS) testing to check their developed software for software code vulnerabilities that could be exploited by hackers and malicious individuals. SAS testing typically includes static application security testing (SAST) and is designed to analyze application source code, byte code, and binaries of an application from the "inside out" in a non-running state (in other words, static testing involves examination of a software program's code and its associated documentation but does not require the software program be executed) for coding and design conditions that are indicative of security vulnerabilities in the software's inputs and outputs that can easily be missed by a programmer. The latest release-versioned SAS tools are normally not consumable by an older (legacy)-versioned release of software development tools (e.g., as part of a particular version of an application builder tool/suite) as the legacy-versioned software development tools either do not contain SAST functionality or out-of-date SAST functionality. Legacy-versioned software development tools remote from a software system executing the latest release-versioned software development tools/SAS tool are also not able to consume the latest release-versioned SAS tools. In some implementations, this situation may be due to, for example, obsolete elements of a software language syntax, incompatible standard code (e.g., signatures of delivered software language function modules, classes, data dictionary elements, etc.), differences in data and control flow in updated standard code, and/or customization modifications to standard code performed by a software developer. As the SAS tools provide the ability to check for, among other things, application backdoors, malicious code, and other threats that may exist in deployed software-applications, the inability of business customers/partners executing legacy-versioned software development tools to use the latest release-versioned SAS testing tools for software developed on a remote software system (RSS) using the legacy-versioned releases of their software development tools can result in software that may contain unnecessary security vulnerabilities.

Among other things, this disclosure describes a server (e.g., an application server or other server) add-on for code vulnerability analysis that can be used to integrate an RSS to a CCS. The server add-on includes functionality to use remote functions, which allow both a software supplier and business customer/partner to perform SAS testing of software source code using a single check system (e.g., a CCS) with a latest release of software development tools and SAS testing functionality, even if an RSS is using legacy software development tools.

In a typical implementation, an exemplary summary of high-level steps for exploiting software compiler outputs for release-independent remote code vulnerability analysis include:

1. A computing system is configured as a CSS by including an extended syntax check tool (SLIN) remote check function and to execute the latest-versioned release of software development tools with SAS testing functionality. A CCS can be provided by the owner of an RSS computing system or by a third-party that allows the RSS owner to connect to the third-party-provided CCS for SAS testing purposes.
2. The CSS is interoperably connected to an RSS computing system (e.g., with a remote function call (RFC) or other connection).
3. A SLIN stub is installed on the RSS. The SLIN stub is a small software module that allows the CCS to access data on the RSS necessary for performing SAS tests on the CCS.
4. SAS testing is triggered in the CCS (e.g., using quality assurance (QA) tools) and, in some implementations, includes the following steps:
    a. The CSS fetches the necessary testing data from the RSS to perform SAS testing on the CCS for software source code on the RSS.
    b. The CCS performs the SAS tests on the CCS.
    c. The CCS provides SAS test results in a required format (e.g., as text, etc.).
5. These steps can be repeated from step 2 for every RSS system connected to the CCS. The SAS testing of each RSS is independent from SAS testing of other RSSs.

FIG. 1 is a high-level architectural block diagram 100 illustrating an example distributed computing system (EDCS) for exploiting software compiler outputs for release-independent remote code vulnerability analysis, according to an implementation. At a high-level, the EDCS includes a remote software system (RSS) 102 and a central check system (CCS) 104 connected by a network 140. While all connections between the RSS 102, CCS 104, a developer 106, and a quality manager 108 are indicated as part of network 140, those of ordinary skill in the art will appreciate that network 140 can be made up of many different interoperably coupled networks functioning together. While illustrated with one RSS 102, in other implementations, there can be multiple RSSs 102 interoperably coupled with the CCS 104.

In typical implementations, the RSS 102 typically includes an extended syntax check tool (SLIN) stub 110 as part of a SLIN remove checking stub 112 which together allow SAS SAST for a software program using SLIN functionality on the CCS 104, software development object data 114 (e.g., illustrated as including source code 115a, other data 115b (e.g., lists or database tables of indexes that links statements (source code statements), symbols (e.g., a character string recognized during lexical analysis of software source code by the software compiler, etc.), and tokens (e.g., atomic items such as variables, operators, keywords, special characters, literals, etc.) together that make up software source code and the software source code's structure; metadata of used development objects; and other data), and development data 115c), and software development tools 116. In typical implementations, the RSS 102 executes a legacy version of the software development tools 116 as compared to software development tools (not illustrated) executed by the CCS 104. Note that the RSS 102 is also usually integrated in a particular system landscape, which is not depicted here for reasons of simplicity.

In typical implementations, the CCS 104 includes a SLIN remote check function 118 providing overall functionality to perform remote SLIN testing functionality and test result display/management using at least development data 115c fetched from the RSS 102. The SLIN remote check function 118 typically includes a SLIN security check function 120 used to cache the fetched development data 115c from RSS 102 (e.g., into cache 124) and to perform/manage SLIN testing using a security checker function 122 and the fetched development data 115c from RSS 102. Security checker function 122 typically executes SLIN tests based on various criteria using the fetched development data 115c from the RSS 102 (obtained from the cache 124 as long as the associated software program is the same, same version, etc.).

The remote quality assurance (QA) tool 126 retrieves test results from the SLIN security check function 120 and stores them in QA data 128 (e.g., as results 129b). In typical implementations, the remote QA tool 126 is wrapper-based and provides a front-end (e.g., a graphical user interface (GUI)) for, among other functionality, managing (e.g., triggering, executing, etc.) SAS tests, and managing (e.g., displaying, editing, formatting, etc.) the retrieved test results. QA data 128 typically includes exemption data 129a, the results data 129b (output of a SLIN check described below—a list of code vulnerabilities found), and a hash value 115d.fetched development data 115c. For clarification of some instances of exemption data, assume that a vulnerability has been found in given source code. This might be a "false positive" and be located at a particular line number of the source code. As such, a quality manager may want to exempt this vulnerability. Since source code can change with time (e.g., insertion of comments, etc.), the line number itself cannot accurately be used to link a vulnerability and an exemption. The QA data 128 (the link between the vulnerability and exemption) can, in some implementations, be a HASH-value 115d computed using the surrounding source code lines (e.g., +/–five or ten source code lines). The QA data is then considered the HASH-value 115d and exemptions together. The In typical implementations, the CCS 104 executes a version of software development tools (not illustrated) that are a more current version as compared to the legacy software development tools 116 executed by the RSS 102.

A software compiler typically generally transforms a file written in a source computing language into a file written in a target computing language. While the source and target computing language could be any computing language (e.g., C, C++, etc.), in a typical case, the source language can be the ABAP programming language (plus metadata of the used development objects—e.g., other data 115b) and the target language can be ABAP byte code that can be executed by an ABAP virtual machine and tested using dynamic-type software testing tools, manual testing, etc.

Besides the above-mentioned byte code, which represents the primary output of a software compiler, the software compiler does provide further outputs, including the above-mentioned source code derivatives. As described above, the source code derivatives can be typically stored on the RSS 102 by the software compiler in development data 115c (as part of the software development object data 114). In typical implementations, the software code derivatives can represent an abstract description of a software program and consist of several data-tables. The data-tables can contain, for example:

A list of statements occurring in the source file
A list of symbols occurring in the source file
A list of tokens, A list of enhancements, and Any data describing the program structure.

In various other implementations and as will appreciated by those of ordinary skill in the art, the source code derivatives can contain similar and/or other data dependent upon, for example, the source file language, software compiler used, target file language, and the like. The above-provided example outputs are not meant to limit this disclosure or the described functionality in any way.

In the described functionality, the software compiler in the RSS 102 is typically used only to assure the correctness (e.g., syntax-error free condition) of the software source code and to generate source code derivatives. In general, the use of source code derivatives can help to avoid incompatibility problems which would be seen in typical software testing of byte code using the described EDCS of FIG. 1 if a compilation step would be performed on the CCS 104 using a later-versioned release software compiler with legacy-versioned source code from the RSS 102. In typical implementations of the described functionality, the software compiler and the software source code on the RSS 102 is based on the same version of software development tools.

Instead of using the base software source code store on the RSS 102, the above-described remote check functionality on CCS 104 performs SAS tests of source code developed on RSS 102 based on processing and analysis of the fetched source code derivatives This means that instead of RSS 102 source code being moved from the RSS 102 to the CCS 104 to be tested, the remote check functionally on the CCS 104 fetches the source code derivatives that are created in the RSS 102 (e.g., using a local legacy-versioned software compiler in software development tools 116) with which to perform SAS testing.

One advantage of transferring only source code derivatives between the RSS 102 and the CCS 104 is an increase in security for the developers of software in that valuable source code is not vulnerable to interception over a network. The transfer of only source code derivatives allows a CCS 104 with a later version of software development tools including SAS testing functionality to perform static testing of the transferred source code derivatives from the RSS 102, even with source code derivatives based on software developed with legacy versions of software development tools. This removes the necessity of a different check system with particular software development tool versions to be established by a business customer/partner on the same system/locally for each of their software systems. The RSS 102 can be tested independent of its underlying hardware and software release version by the CSS 104 and does not have to be upgraded to a particular software release version to allow for the latest testing technologies to be used. Additionally, to use the CCS 104, an RSS 102 needs only to interface with the CCS 104 using a server add-on to provide the necessary interfaces between the RSS 102 and the CCS 104. The approach allows multiple systems representing different system landscapes (e.g., development, quality, and production) to independently perform SAS testing (e.g., using the remote QA tool 126) of the CCS 104 to perform software testing and functions related to generated test results. Network traffic between the RSS 102 and the CCS 104 is reduced, since source code derivatives typically require less storage than full byte code. Overall computing time is also saved because, on the CCS 104, scanning and parsing of software source code is unnecessary. This is because the code derivatives fetched from the RSS 102 are resultant outputs of prior scanning, parsing, etc. already performed by the RSS 102 software compiler of the software source code stored on the RSS 102.

At a lower-level, FIG. 1 illustrates that at least one computing system has been configured as a CCS 104 with the illustrated SLIN remote function 118 (and associated sub-components). The CCS 104 is then connected (e.g., using a remote function call (RFC) or other type of connection) to another computing system configured as an RSS 102. For example, the connection between the RSS 102 and the CCS 104 is indicated in FIG. 1 by the two network 130 connections between the RSS 102 and the CCS 104.

On the RSS 102, the SLIN remove checking stub 112 is used to permit/re-direct SLIN testing to be performed by SLIN functionality on the CCS 104 (e.g., the SLIN remote check function 118 uses the SLIN security check function 120 which uses the SLIN stub 110 as an interface to data sources—such as database tables, metadata, etc.—on the RSS 102). Note that in typical implementations, local checks can still be performed on the RSS 102 if desired (within the limitations allowed by the local testing/check tools, etc.).

In typical implementations, when SAS testing is triggered on the CCS 104 by the developer 108 or the quality manager 108 using the quality assurance 126 tool, development data 115c (e.g., code derivatives) required for SAS testing is fetched by the security checker function 122 from the RSS 102 software development object data 114. The development data 115c from is typically cached in cache 124 for performance reasons. In typical implementations, development data 115c has been previously created by a local means on RSS 102 (e.g., using the above-described software compiler in software development tools 116). In some implementations, if the necessary data 115c is not available (e.g., the SLIN security check function 120 tries and fails to recover the required development data 115c from cache 124, receives notice from the SLIN stub 110 that development data 115c is unavailable, etc.), the security checker function 120 can be used to trigger the software compiler on the RSS 102 using the SLIN stub 110 (e.g., using a syntax check call as described below). The security checker function 122 on the CCS 104 then performs SAS-based SLIN tests based on the fetched development data 115c. The SLIN security check function 120 then provides generated test results to a wrapper-based remote QA tool (e.g., remote QA tool 126) providing a front-end for displaying and managing the generated test results.

Figure 2:
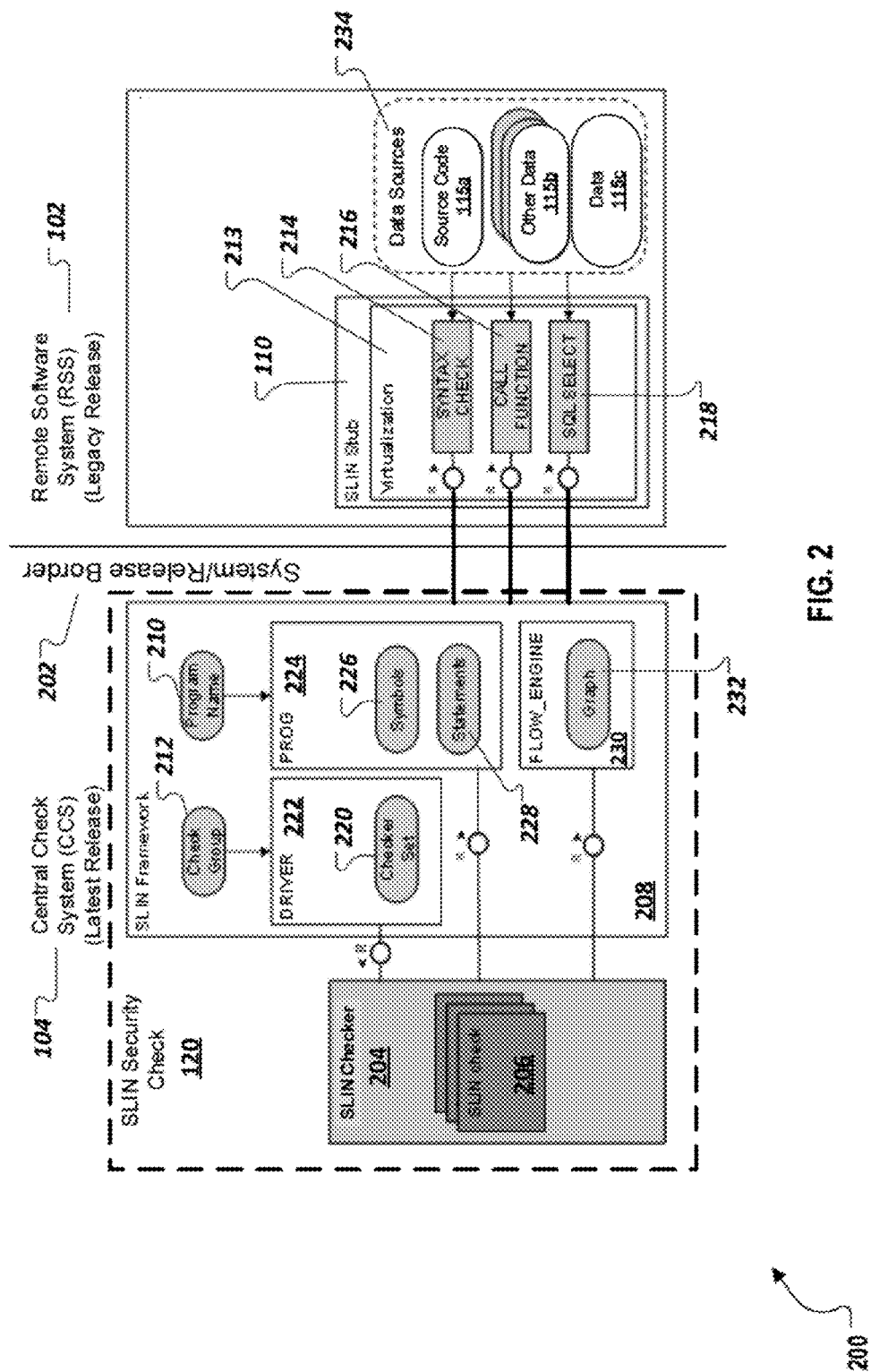
FIG. 2 is a lower-level architectural block diagram illustrating additional components of the EDCS of FIG. 1 for exploiting software compiler outputs for release-independent remote code vulnerability analysis, according to an implementation.

Turning now to FIG. 2, FIG. 2 is a lower-level architectural block diagram 200 illustrating additional components of the EDCS of FIG. 1 for exploiting software compiler outputs for release-independent remote code vulnerability analysis, according to an implementation. In FIG. 2, the illustrated EDCS includes the RSS 102 and CCS 104 separated by a system release border 202 indicating where data is retrieved from the RSS 102 and imported into the CCS 104. Accordingly, SAS testing is performed on software source code that originates on a different system. Additionally, the system release border indicates that the RSS is executing a legacy-versioned release of software development tools and the CCS 104 is executing a latest-versioned release of the software development tools. As in FIG. 1, the RSS 102 and the CCS 104 are interoperably connected by network 140 (not explicitly illustrated). As in FIG. 1, while FIG. 2 is illustrated with one RSS 102, in other implementations, there can be multiple RSSs 102 interoperably coupled with the CCS 104.

SAS tests are performed by the CCS 104 by executing SLIN checker function 204, where each individual SLIN check 206 is a rule or rules used by the SLIN checker function 204 for testing the software source code for one or more particular vulnerabilities (e.g., SQL injection, directory traversals, and other vulnerabilities). In some implementations (and as illustrated in FIG. 2), the SLIN checker function 204 can be implemented as separate software classes implementing particular interfaces. For example, FIG. 2 illustrates the SLIN checker function 204 as an agent outside a defined SLIN framework 208 (a component framework).

The SLIN framework 208 is typically provided with a program name 210 (e.g., the name of a software source file to be tested) as well as a definition of a check group 212 (e.g., a set of SLIN checks 206 that represent the scope of a particular SAS testing effort—i.e., the set of SLIN checks 206 defines what the particular software source code is to be tested for). In typical implementations, the SLIN framework 208 (as a component framework) provides information for the SLIN checks 206. The SLIN framework 208 can be used to call the software compiler on the RSS 102 through the SLIN stub 110 using a syntax check statement 214 to request a syntax check of stored source code, obtaining metadata related to function modules with a call function statement 216, or obtaining metadata related to database tables using a SQL select statement 218. In other implementations, additional or other statements can be available/used to perform functionally consistent with this disclosure.

The SLIN security check 120 retrieves the required data directly from the RSS 102 (e.g., using RFC or other calls). This is achieved by introducing the notion of "data sources" (e.g., data sources 234). In this notion, each database table access or relevant access statement (e.g., syntax check statement 214) is wrapped by a corresponding call (e.g., an RFC or other call). A data source represents one specific element of the code derivatives or metadata information required for SAS testing. In typical implementations, a data source may be: 1) the output of a specific statement (e.g., the syntax check statement 214 which internally triggers the software compiler on the RSS 102); 2) a function module that selects data from one or more database tables (e.g., metadata information from call function 216); 3) or a particular database table (e.g., using the SQL select 218).

The access to data sources is encapsulated by the SLIN stub 110 using a logical virtualization layer 213 (e.g., a wrapper class providing APIs to virtualize data access). Generally, a particular set of data sources that need to be encapsulated depend upon the check(s) that need to be performed. For example, if checks are simply analyzing source code, access to the syntax check 214 would be enough. If checks analyze potential data flow from a user interface, access to a user interface data source storing a design of the user interface is needed (e.g., a database where SQL select 218 can be used). FIG. 2 illustrates the virtualization layer 213 which encapsulating a set of API remote function calls that wrap statements (e.g., the above-described syntax check 214, call function 216, SQL and select 218) used to access the data sources 234 on the RSS 102. In some implementations, access to each data source in data sources 234 can be provided by a separate class method. Note that in some implementations, the syntax check 214 is provided by a software compiler on RSS 102.

Figure 3:
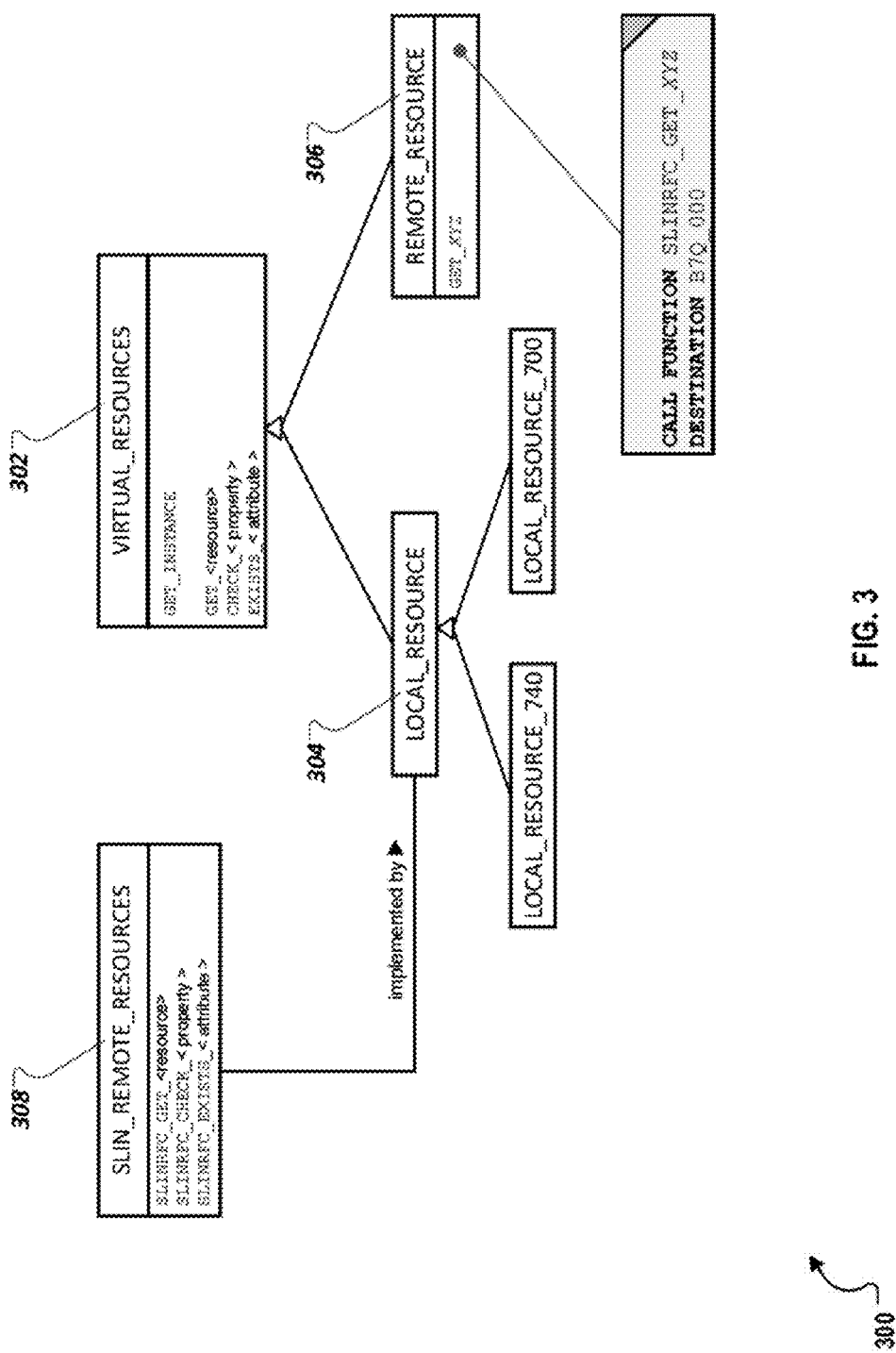
FIG. 3 illustrates an example unified modeling language (UML) class diagram of the virtualization layer described with respect to FIG. 2, according to an implementation.

For example, turning to FIG. 3, FIG. 3 illustrates an example unified modeling language (UML) class diagram 300 of the virtualization layer 213 described with respect to FIG. 2, according to an implementation. The class diagram 300 depicts the template class VIRUTAL_RESOURCES 302 with its two concrete implementations LOCAL_RE-SOURCE 304, which realizes local data access, and REMOTE_RESOURCE 306, which realizes remote data access. Each method of REMOTE_RESOURCE 306 is implemented using an RFC function module of the function group SLIN_REMOTE_RESOURCES 308.

In some implementations, as will be understood by those of ordinary skill in the art, the virtualization layer 213 can be excluded from the described implementation(s). Returning to FIG. 2, typically, SAS testing is performed with three high-level steps:

1. Checker orchestration—particular SLIN checks 206 to be performed (identified by check group(s) 212) are collected and instantiated (e.g., as a class) into a checker set 220 using driver component 222. The driver component 222 executes the SLIN checks 206 from the checker set 220 against applicable development data (e.g., source code derivatives from development data 115c).

2. Information collection and preparation—code derivatives (e.g., extracted scan and symbol information and metadata required for code analysis) is collected from the RSS 102 and pre-processed/stored by the PROG 226 component (e.g., using the syntax check 214 or scan statement—note that in ABAP, syntax check and scan are statements used to obtain source code derivatives). Typically, the PROG 226 component connects to the SLIN stub 110 and calls a software compiler on the RSS 102, first using a syntax check 214 executed on the RSS 102 to confirm the correctness of the software program, and second using scan operation executed on the RSS 102 to retrieve source code derivatives (e.g., parser output in the form of a token list, etc.). In some implementations, the PROG 226 component can trigger a compile operation on the RSS 102 to pre-populate data stores for needed data (e.g., the code derivatives). The PROG 226 component is responsible for collecting various information by accessing the software source code to be checked and by using the various encapsulated service functions (e.g., syntax check 214, etc.) to providing access to data (e.g., source code 115a, other data 115b, development data 115c, etc.)

3. Check performance—SLIN checks 206 are performed and SLIN check results are created. The check performance is based on calling interface methods implemented by each SLIN check 206 which has access to information stored in PROG 226 component to perform the actual software source code analysis. SLIN checks can make use of data flow and control flow graphs 232 provided by the flow engine component 230 which computes data/control flow graphs of the software program being analyzed based on data stored in the PROG 226 component. For example, the flow engine component 230 analyzes a list of statements in a software program with regard to read and write statements for each data element (e.g., variable) in the software program to be analyzed. Sequences of read and write access to the variables of a program allow a data flow graph to be constructed. A data/control flow graph 232 also includes APIs that can be used to traverse the graph (e.g., given a starting point such as a source or user input or some input field in a user interface, the graph can be traversed node-by-node until a sink can be found. The task of a SLIN security check is to assures that along this path—from source to sink—a validation of the input data (e.g., data provided via input field of the user interface) was performed within the software program). For performance reasons, the information collected for the software source code to be checked (at 2)) is typically cached in a set of data base tables (e.g., cache 124 of FIG. 1). Based on time stamp comparison or other factors consistent with this disclosure, this cached data can be invalidated, if necessary. The SLIN check result is made available in a quality system (e.g., remote QA tool 126 in FIG. 1). Quality-experts as well as developers are provided with the SLIN check results in a way that allows for correcting and identified vulnerabilities (e.g., developers can access the SLIN check results in the quality system, but can also directly navigate from the scan report to the corresponding source code in the RSS 102 and also view software source code documentation. For a quality manager, a SLIN check results are available in the quality system).

Figure 4:
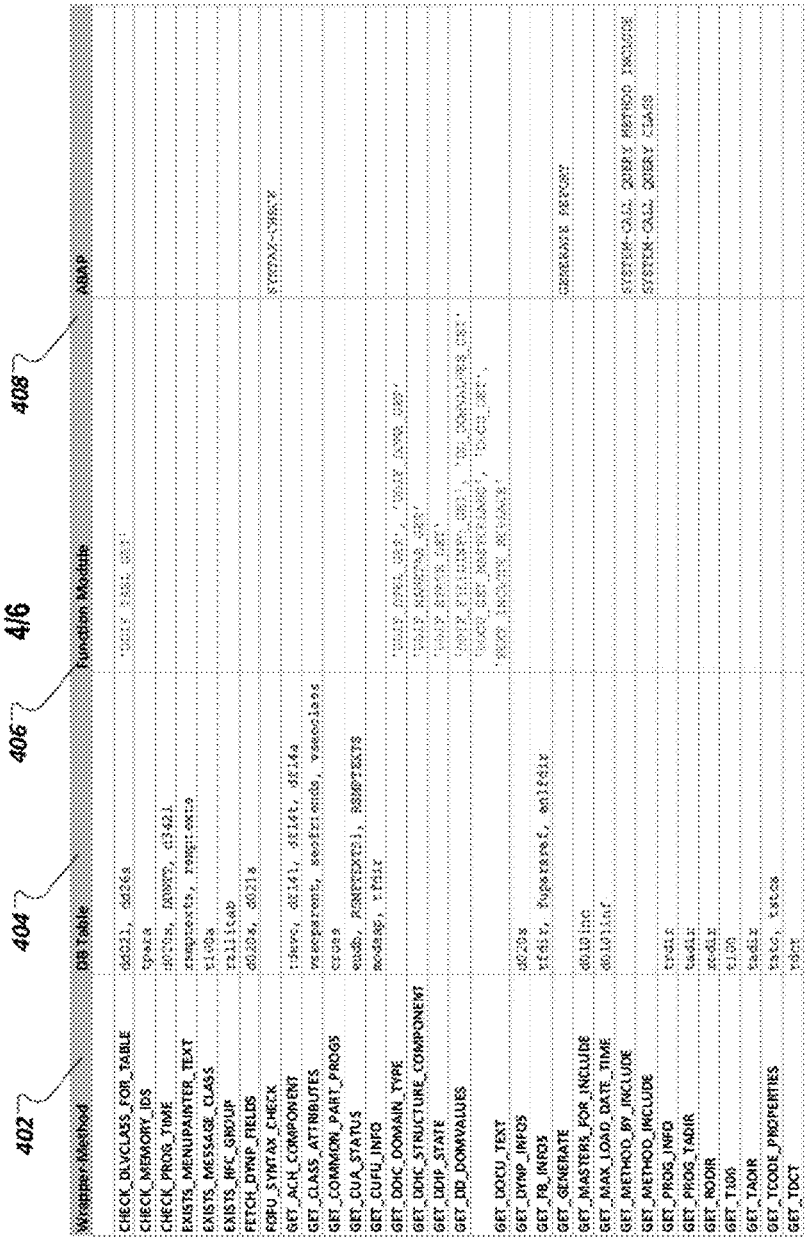
FIG. 4 is a screenshot of an example extended syntax check tool (SLIN) scan report, according to an implementation.

FIG. 4 is a screenshot 400 of example data sources encapsulated/wrapped by a SLIN stub, according to an implementation. For example, the in screenshot 400, the SLIN stub consists of 32 wrapper methods (column 402). In FIG. 2, there are three types of wrapper methods (see virtualization 213): 1) access to database tables in the RSS 102 (column 404, SQL select 218 of FIG. 2); 2) function calls (column 406, call function 216 of FIG. 2), and ABAP statements (col. 408).

Figure 5:
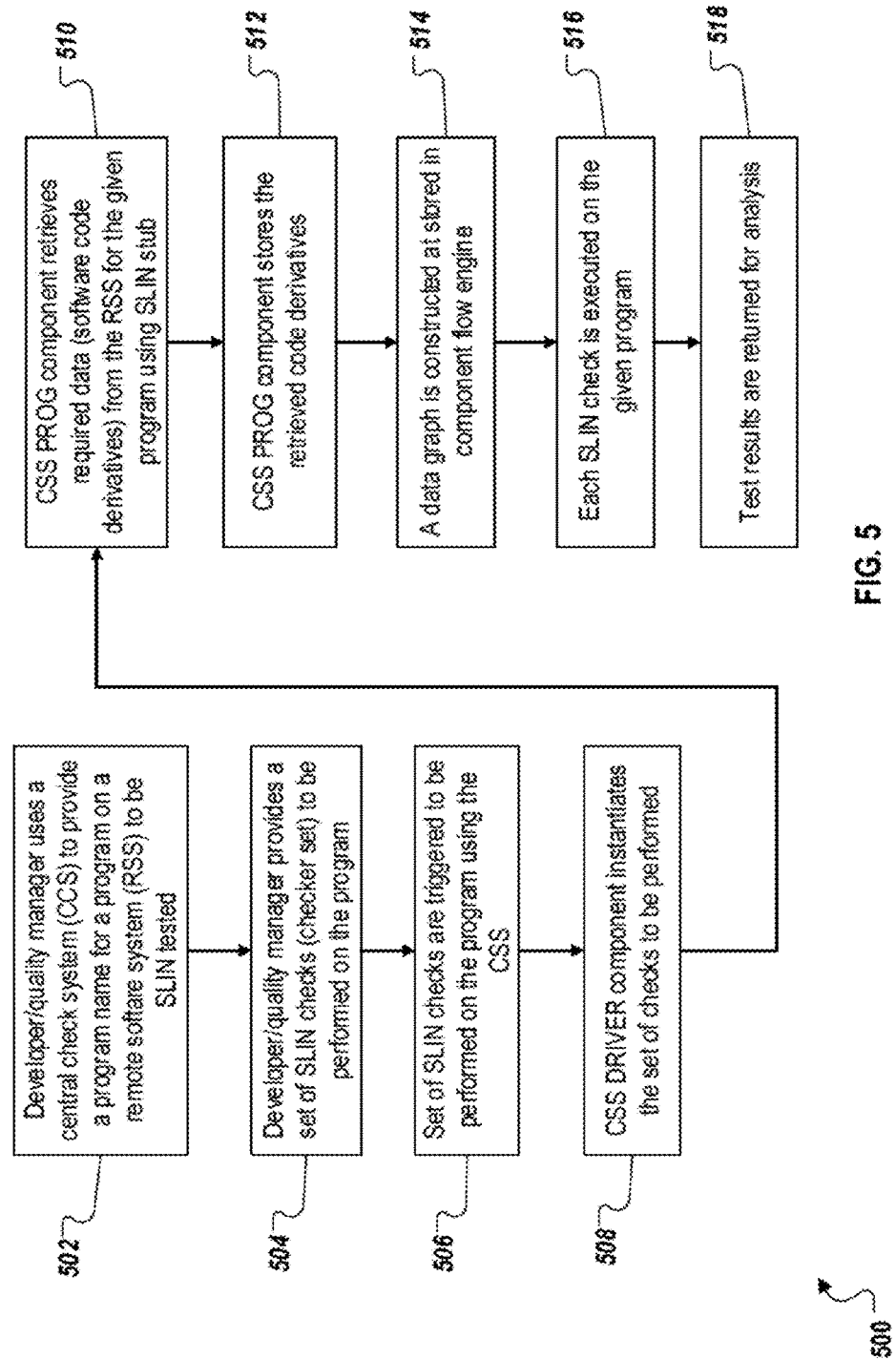
FIG. 5 is a flow chart of an example method for exploiting software compiler outputs for release-independent remote code vulnerability analysis, according to an implementation.

FIG. 5 is a flow chart of an example method for exploiting software compiler outputs for release-independent remote code vulnerability analysis, according to an implementation. For clarity of presentation, the description that follows generally describes method 500 in the context of FIGS. 1-4 and 6. However, it will be understood that method 500 may be performed, for example, by any other suitable system, environment, software, and hardware, or a combination of systems, environments, software, and hardware as appropriate.

At 502, a developer/quality or manager uses a central check system (CCS) to provide a program name to be checked using SLIN testing (e.g., using a quality assurance (QA) tool). The program name is for software source code that exists on a remote software system (RSS). From 502, method 500 proceeds to 504.

At 504, the developer/quality manager provides a set of SLIN checks to be performed on the program. From 504, method 500 proceeds to 506.

At 506, the set of SLIN checks are triggered to be performed on the program (e.g., using the CSS quality assurance (QA) tool). From 506, method 500 proceeds to 508.

At 508, the CSS DRIVER component instantiates the set of checks to be performed against the given program. From 508, method 500 proceeds to 510.

At 510, the CSS PROG component retrieves required data (software code derivatives) from the RSS for the given program using a SLIN stub. Here, PROG component connects to a SLIN stub by calling a SYNTAX CHECK statement in the RSS for the given program. The SLIN stub packages the code derivatives (created by a software compiler on the RSS, which has been triggered by the SYNTAX CHECK call) and provides it to the CCS (e.g., data transfer is done using Remote Function Calls (RFC)). From 510, method 500 proceeds to 512.

At 512, the code derivatives of the remote program on the RSS are stored in the CSS PROG component. From 512, method 500 proceeds to 514.

At 514, from the retrieved code derivatives, a data flow graph is constructed and stored a CSS FLOW ENGINE component. From 514, method 500 proceeds to 516.

At 516, each SLIN check is performed on the given program. For each SLIN check in the checker set:
  The CSS PROG and FLOW ENGINE components provide interfaces to the SLIN check for access to their data,
  The SLIN Check analyses the retrieved software code derivatives according to check rules in the SLIN check, and
  Depending on the given program's structure, the SLIN Check requests additional data (metadata) using the CSS PROG component from the RSS. For example, if a 'CALL FUNCTION' is found in the given program, the called function itself will be implemented in a different program (e.g., a compilation unit) so further data about other programs are retrieved on demand during the SLIN check.

From 516, method 500 proceeds to 518.

At 518, SLIN test results are returned for analysis, for example using the CSS quality assurance (QA) tool or a development tool. After 518, method 500 stops.

Figure 6:
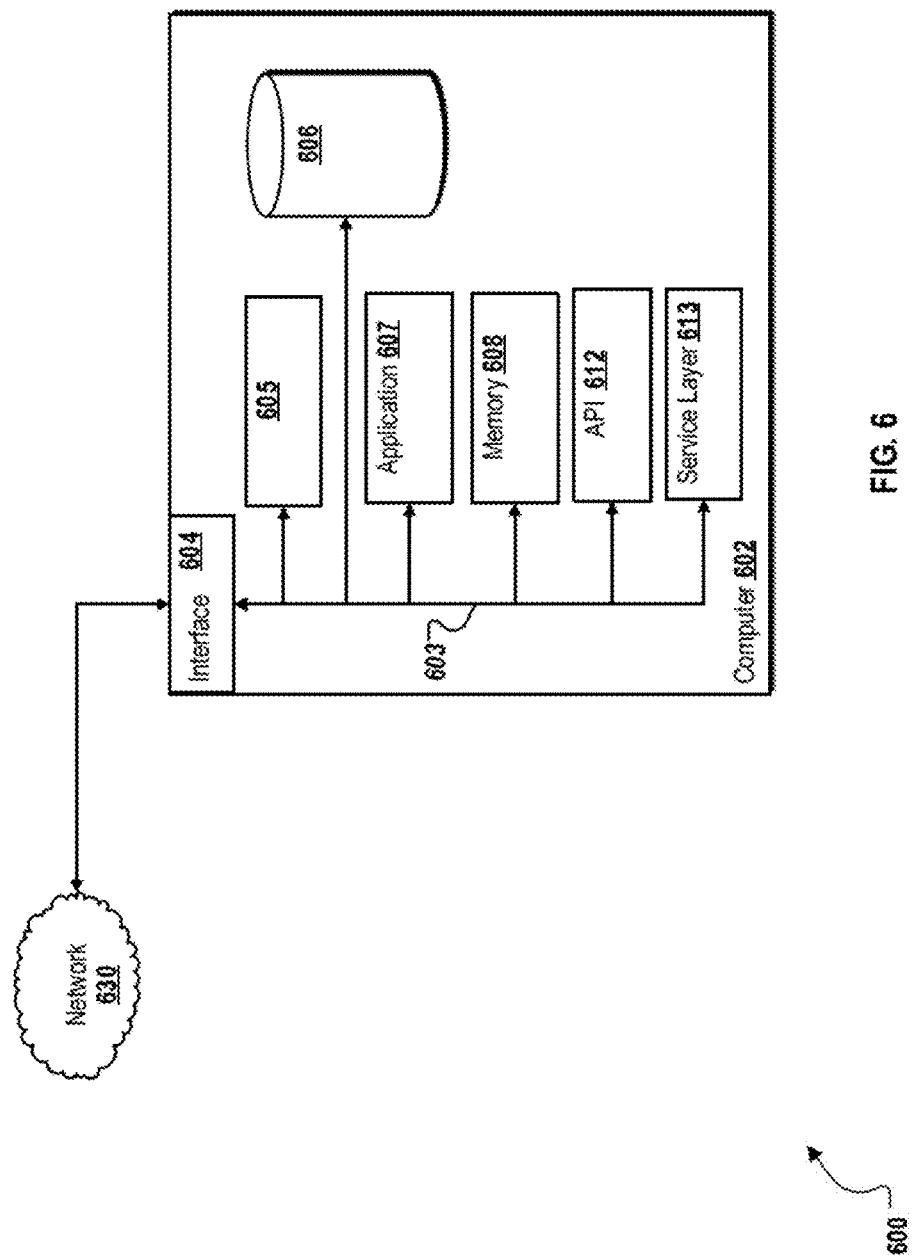
FIG. 6 is a block diagram of an exemplary computer used in the EDCS, according to an implementation.

FIG. 6 is a block diagram 600 of an exemplary computer 602 used in the EDCS, according to an implementation. The illustrated computer 602 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 602 may comprise a computer that includes an input device, such as a keypad, keyboard, touch screen, or other device that can accept user information, and an output device that conveys information associated with the operation of the computer 602, including digital data, visual and/or audio information, or a GUI.

The computer 602 can process for/serve as a client, a server, and/or any other component of the EDCS (whether or not illustrated). The illustrated computer 602 is communicably coupled with a network 630 (e.g., network 140 of FIGS. 1 and 2). In some implementations, one or more components of the computer 602 may be configured to operate within a cloud-computing-based environment.

At a high level, the computer 602 is an electronic computing device operable to receive, transmit, process, store, or manage data and information associated with the EDCS. According to some implementations, the computer 602 may also include or be communicably coupled with a cloud-computing server, application server, e-mail server, web server, caching server, streaming data server, business intelligence (BI) server, and/or other server.

The computer 602 can generate requests to transmit over network 630 (e.g., as a client 102) or receive requests over network 630 from a client application (e.g., a web browser or other application) and responding to the received requests by processing the said requests in an appropriate software application, hardware, etc. In addition, requests may also be sent to the computer 602 from internal users (e.g., from a command console or by other appropriate access method), external or third-parties, other automated applications, as well as any other appropriate entities, individuals, systems, or computers.

Each of the components of the computer 602 can communicate using a system bus 603. In some implementations, any and/or all the components of the computer 602, both hardware and/or software, may interface with each other and/or the interface 604 over the system bus 603 using an API 612 and/or a service layer 613. The API 612 may include specifications for routines, data structures, and object classes. The API 612 may be either computer-language independent or dependent and refer to a complete interface, a single function, or even a set of APIs. The service layer 613 provides software services to the computer 602 and/or the EDCS. The functionality of the computer 602 may be accessible for all service consumers using this service layer. Software services, such as those provided by the service layer 613, provide reusable, defined business functionalities through a defined interface. For example, the interface may be software written in JAVA, C++, ABAP, or other suitable language providing data in extensible markup language (XML) format or other suitable format. While illustrated as an integrated component of the computer 602, alternative implementations may illustrate the API 612 and/or the service layer 613 as stand-alone components in relation to other components of the computer 602 and/or the EDCS. Moreover, any or all parts of the API 612 and/or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602 and/or the EDCS. The interface 604 is used by the computer 602 for communicating with other systems in a distributed environment—including within the EDCS—connected to the network 630 (whether illustrated or not). Generally, the interface 604 comprises logic encoded in software and/or hardware in a suitable combination and operable to communicate with the network 630. More specifically, the interface 604 may comprise software supporting one or more communication protocols associated with communications such that the network 630 or interface's hardware is operable to communicate physical signals within and outside of the illustrated EDCS.

The computer 602 includes a processor 605. Although illustrated as a single processor 605 in FIG. 6, two or more processors may be used according to particular needs, desires, or particular implementations of the computer 602 and/or the EDCS. Generally, the processor 605 executes instructions and manipulates data to perform the operations of the computer 602. Specifically, the processor 605 executes the functionality required for exploiting software compiler outputs for release-independent remote code vulnerability analysis.

The computer 602 also includes a database 606 and memory 608 that hold data for the computer 602 and/or other components of the EDCS. Although illustrated as a single database 606 and memory 608 in FIG. 6, two or more databases 608 and memories 608 may be used according to particular needs, desires, or particular implementations of the computer 602 and/or the EDCS. While database 608 and memory 608 are illustrated as integral components of the computer 602, in alternative implementations, the database 606 and memory 608 can be external to the computer 602 and/or the EDCS. In some implementations, the database can be a conventional database or an in-memory database, or a mix of both. In some implementations, the database 606 and memory 608 can be combined into one component.

The application 607 is an algorithmic software engine providing functionality according to particular needs, desires, or particular implementations of the computer 602 and/or the EDCS, particularly with respect to functionalities required for exploiting software compiler outputs for release-independent remote code vulnerability analysis. For example, application 607 can serve as a subcomponent of an RSS 102/CCS 104 or any other component of the EDCS (whether or not illustrated). Further, although illustrated as a single application 607, the application 607 may be implemented as multiple applications 607 on the computer 602. In addition, although illustrated as integral to the computer 602, in alternative implementations, the application 607 can be external to the computer 602 and/or the EDCS.

There may be any number of computers 602 associated with, or external to, the EDCS and communicating over network 630. Further, the term "client," "user," and other appropriate terminology may be used interchangeably as appropriate without departing from the scope of this disclosure. Moreover, this disclosure contemplates that many users may use one computer 602, or that one user may use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and/or parallel processing may be advantageous and performed as deemed appropriate.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
   coupling a central check system (CCS) to a remote software system (RSS);
   fetching data from the RSS, the data being software code derivatives generated from a software program by a software compiler on the RSS with a version different than a version of the same software compiler associated with the CCS, wherein the software compiler on the RSS is used to ensure the syntactic correctness of the software program on the RSS and to generate the software code derivatives on the RSS prior to transmission to the CCS;
   performing static software testing of the software program on the CCS using the fetched data and a data flow graph constructed from the fetched data and including an application programming interface used to traverse the data flow graph; and
   providing test results based on the static software testing in a required format.

2. The method of claim 1, wherein the software compiler version on the RSS is earlier than the software compiler version associated with the CCS.

3. The method of claim 1, wherein the software code derivatives represent an abstract description of the software program.

4. The method of claim 3, wherein the software code derivatives include one or more of a list of statements occurring in the software program, a list of symbols occurring in the software program, a list of tokens, a list of enhancements, and data describing the structure of the software program.

5. The method of claim 3, wherein the software code derivatives are generated based on the software language used to construct the software program and metadata of development objects used in the software program.

6. The method of claim 1, wherein the RSS interfaces with the CCS using a server add-on.

7. The method of claim 1, wherein software code derivatives are used for testing of the software program on the CCS to avoid incompatibilities between compiled software program byte code associated with the version of the software program on the RSS and the software compiler version of the CCS.

8. The method of claim 1, comprising, while fetching the software code derivatives, requesting, on-demand, additional metadata related to the fetched software code derivatives.

9. A non-transitory, computer-readable medium storing computer-readable instructions, the instructions executable by a computer and configured to:
   couple a central check system (CCS) to a remote software system (RSS);
   fetch data from the RSS, the data being software code derivatives generated from a software program by a software compiler on the RSS with a version different than a version of the same software compiler associated with the CCS, wherein the software compiler on the RSS is used to ensure the syntactic correctness of the software program on the RSS and to generate the software code derivatives on the RSS prior to transmission to the CCS;
   perform static software testing of the software program on the CCS using the fetched data and a data flow graph constructed from the fetched data and including an application programming interface used to traverse the data flow graph; and
   provide test results based on the static software testing in a required format.

10. The non-transitory, computer-readable medium of claim 9, wherein the software compiler version on the RSS is earlier than the software compiler version associated with the CCS.

11. The non-transitory, computer-readable medium of claim 9, wherein the software code derivatives represent an abstract description of the software program.

12. The non-transitory, computer-readable medium of claim 11, wherein the software code derivatives include one or more of a list of statements occurring in the software program, a list of symbols occurring in the software program, a list of tokens, a list of enhancements, and data descripting the structure of the software program.

13. The non-transitory, computer-readable medium of claim 11, wherein the software code derivatives are generated based on the software language used to construct the software program and metadata of development objects used in the software program.

14. The non-transitory, computer-readable medium of claim 9, wherein the RSS interfaces with the CCS using a server add-on.

15. The non-transitory, computer-readable medium of claim 9, wherein software code derivatives are used for testing of the software program on the CCS to avoid incompatibilities between compiled software program byte code associated with the version of the software program on the RSS and the software compiler version of the CCS.

16. The non-transitory, computer-readable medium of claim 9, comprising instructions to, while fetching the software code derivatives, request, on-demand, additional metadata related to the fetched software code derivatives.

17. A system, comprising:
a memory;
at least one hardware processor interoperably coupled with the memory and configured to:
  couple a central check system (CCS) to a remote software system (RSS);
  fetch data from the RSS, the data being software code derivatives generated from a software program by a software compiler on the RSS with a version different than a version of the same software compiler associated with the CCS, wherein the software compiler on the RSS is used to ensure the syntactic correctness of the software program on the RSS and to generate the software code derivatives on the RSS prior to transmission to the CCS;
  perform static software testing of the software program on the CCS using the fetched data and a data flow graph constructed from the fetched data and including an application programming interface used to traverse the data flow graph; and
  provide test results based on the static software testing in a required format.

18. The system of claim 17, wherein the software code derivatives represent an abstract description of the software program, wherein the software code derivatives include one or more of a list of statements occurring in the software program, a list of symbols occurring in the software program, a list of tokens, a list of enhancements, and data descripting the structure of the software program, wherein the software code derivatives are generated based on the software language used to construct the software program and metadata of development objects used in the software program, and wherein the software code derivatives are used for testing of the software program on the CCS to avoid incompatibilities between compiled software program byte code associated with the version of the software compiler on the RSS and the software compiler version of the CCS.

19. The system of claim 17, wherein the RSS interfaces with the CCS using a server add-on, and wherein the software compiler version on the RSS is earlier than the software compiler version associated with the CCS.

20. The system of claim 17, comprising instructions to, while fetching the software code derivatives, request, on-demand, additional metadata related to the fetched software code derivatives.

* * * * *